United States Patent

[11] 3,600,092

[72] Inventor Murata, Yukio
 Takarazuka-shi, Japan
[21] Appl. No. 653,887
[22] Filed July 17, 1967
[45] Patented Aug. 17, 1971
[73] Assignee Sumitomo Chemical Company, Ltd.
 Osaka, Japan
[32] Priority July 20, 1966
[33] Japan
[31] 41/47884

[54] APPARATUS FOR MEASURING DENSITY STIMULUS VALUES OF THREE PRIMARY COLORS
3 Claims, 5 Drawing Figs.

[52] U.S. Cl........................................................ 356/92,
 356/176, 235/61, 356/173, 250/226
[51] Int. Cl......................................................... G01j 3/46,
 G01j 3/50
[50] Field of Search............................................ 356/173,
 176, 177, 92; 235/61; 250/226

[56] References Cited
UNITED STATES PATENTS

| | | | |
|---|---|---|---|
| 1,799,134 | 3/1931 | Hardy.............................. | 346/13 X |
| 2,540,797 | 2/1951 | Stearns, Jr...................... | 235/61 |
| 2,540,798 | 2/1951 | Stearns, Jr...................... | 235/61 |
| 2,542,564 | 2/1951 | Park................................ | 356/176 X |
| 3,098,689 | 7/1963 | Caflisch et al.................. | 346/13 X |
| 2,218,357 | 10/1940 | Pineo.............................. | 356/92 |

OTHER REFERENCES

Derby, Jr., " Applied Spectrophotometry (1) Color Matching With The Aid Of The "R" "CAM," AM Dyestuff R'p'rt'r., Sept. 1, 1952. pp. 550-557.

Allen, " Digital Color Matching," AM Dyestuff R' p'rt' r., May 10, 1965, pp. 365— 371.

Bunkall, " Applications Of Spectrophotometric Measurement In Dyeing & Finishing," Brit. J.S.D.C. May 1965, pp. 201 — 5.

Primary Examiner—Ronald L. Wibert
Assistant Examiner—R. J. Webster
Attorney—Stevens, Davis, Miller & Mosher ABSTRACT: A recording spectrophotometer for measuring the color density of a colored surface necessary for calculating a recipe of color matching based on a colorimetric method, characterized by an integrator capable of calculating density stimulus values of the three primary colors, and an output converter capable of converting the reflectance measured by a photometer to a physical value which is in proportion to the optical density.

APPARATUS FOR MEASURING DENSITY STIMULUS VALUES OF THREE PRIMARY COLORS

This invention relates to an improvement in a recording spectrophotometer for measuring a color density of colored surface necessary for calculating a recipe of color matching based on a colorimetric method.

As a recording spectrophotometer used for this purpose, a Hardy-type recording spectrophotometer provided with a photometric cam, which is well known as an R cam, is available. Said R cam can linearly measure and record a log $(1-R\lambda)^2/2R$, value which is a logarithmic function of $(K/S)\lambda = (1-\lambda)^2/2R$, where $R\lambda$ is a specific reflectance with respect to the standard white surface.

Generally, in the Hardy-type recording spectrophotometer, a rotational angle of the cam is in proportion to log $(1-R\lambda)^2/2R$, and thus said rotational angle is so magnified as to drive a recording pen. An entire range of visible wavelengths can be recorded on a recording paper in which the wave length is indicated on an abscissa and log $(1-R\lambda)^2/2R\lambda$ on an ordinate.

The $(1-R\lambda)^2/2R\lambda$ value is read from the recorded curve for every wavelength by means of a scale called an "R cam ruler," and the density is determined for every wavelength. (R. E. Derby: American Dyestuff Reporter, 41 550 (1952))

The above-mentioned $(1-R\lambda)^2/2R\lambda$ is called the "Kubelka-Munk" function, which is an optical density function derived from the reflectivity and is a value approximately in proportion to the concentration of colorant. However, the actual sensational color density is generally caused by an integrated stimulus of three attributes of color, that is, lightness, saturation, and hue, to the visual sense. Thus, the color density cannot be determined only by $(K/S)\lambda = (1-R\lambda)^2/2R\lambda$ for the single wavelength by means of said R cam, but by measuring and calculating the color stimuli over an entire range of wavelengths of the visible light range.

As a result of researches based on the principle, the present invention has been attained, wherein the actual color density can be determined by measuring the optical density over an entire visible range of wavelengths and automatically converting the thus measured values to color density stimulus amounts connected to the visual sense of human being.

That is to say, when the color of reflecting mass is to be measured according to the present invention, a stimulus value of a specimen is measured for each wavelength, at first, by a cam of the function, which is approximately in proportion to the optical density of reflecting surface, for example, $(1-R\lambda)^2/2R$, in place of the R cam, or by a device capable of converting the rotation of the R cam shaft to the rotation which is in proportion to $(1-R\lambda)^2/2R\lambda$. Then, the thus obtained stimulus values of each wavelength are put in an integrator, whereby the density stimulus values of the three primary colors in proportion to the optical density are integrated according to the following equations:

$$KX = \int (K/S)\lambda \bar{x}\lambda O\lambda d\lambda$$
$$KY = \int (K/S)\lambda \bar{y}\lambda P\lambda d\lambda,$$

and $$KZ = \int (K/S)\lambda \bar{z}\lambda P\lambda d\lambda$$

wherein $\bar{x}\lambda$, $\bar{y}\lambda$, and $\bar{z}\lambda$ are spectral tristimulus values respectively the CIE Standard Observer according to Japan Industrial Standard Z8701 which is an equivalent method for representing color by an X Y Z system, and $P\lambda$ is a spectral distribution of standard illuminant, $(K/S)\lambda = (1-R\lambda)^2/2R\lambda$, $R\lambda$ being a reflectivity in a range of $1 > R\lambda > 0$, and $\lambda$ being a wavelength.

So long as $(K/S)\lambda$ is a function approximately in proportion to the optical density, any function can be used for $(K/S)\lambda$ in addition to the above-mentioned function. For example, the function as disclosed in Example 3 of the present invention can be used. Further, in the present invention, a potentiometer which is adjusted to be in proportion to the above-mentioned function can be likewise used in place of said cam.

The KX, KY and KZ values thus determined are the density stimulus amounts of three primary colors and represent an actual color density connected to the visual sense of a human being.

A prescription of mixed dye concentration for the color matching can be determined by solving the following simultaneous equations using said KX, KY and KZ values. Thus, the present invention has a great utility in the fields of textile, plastic, paint, and the like.

$$\left.\begin{array}{l} KX_s = c_1 KX_1 + c_2 KX_2 + C_3 KX_3 \\ KY_s = C_1 KY_1 + C_2 KY_2 + C_3 KY_3 \\ KZ_s = C_1 KZ_1 + C_2 KZ_2 + C_3 KZ_3 \end{array}\right\}$$

wherein $KX_s$, $KY_s$ and $KZ_s$ are density stimulus amounts of the three primary colors for a pattern; $KX_1$, $KY_1$ and $KZ_1$ are those for a single dyed mass in a reference density (usually 1 percent owf) of Dye 1, one of three kinds of dyes to be mixed; $KX_2$, $KY_2$ and $KZ_2$ are those for Dye 2; $KX_3$, $KY_3$ and $KZ_3$ are those for Dye 3; and $C_1$, $C_2$ and $C_3$ are the mixed dye concentrations of Dye 1, 2 and 3, respectively, and are unknown quantities in this equation.

Many methods have been proposed for solving said simultaneous equations, but the simplest and widely used method is a graphical one (E. Ganz Textile-Rundschau 20, 255 (1965)).

Said integral calculation can be easily carried out by an integrator based either on a selective wavelength method or an equal interval wave length method, and the calculating procedure is almost similar to that for calculating tristimulus values X, Y and Z.

The means for accomplishing the foregoing objects and other advantages, which will be apparent to those skilled in the art, are set forth in the following specification and claims and are illustrated in the accompanying drawings dealing with several embodiments of the present invention. Reference is made now to the drawings in which:

Figure 1:
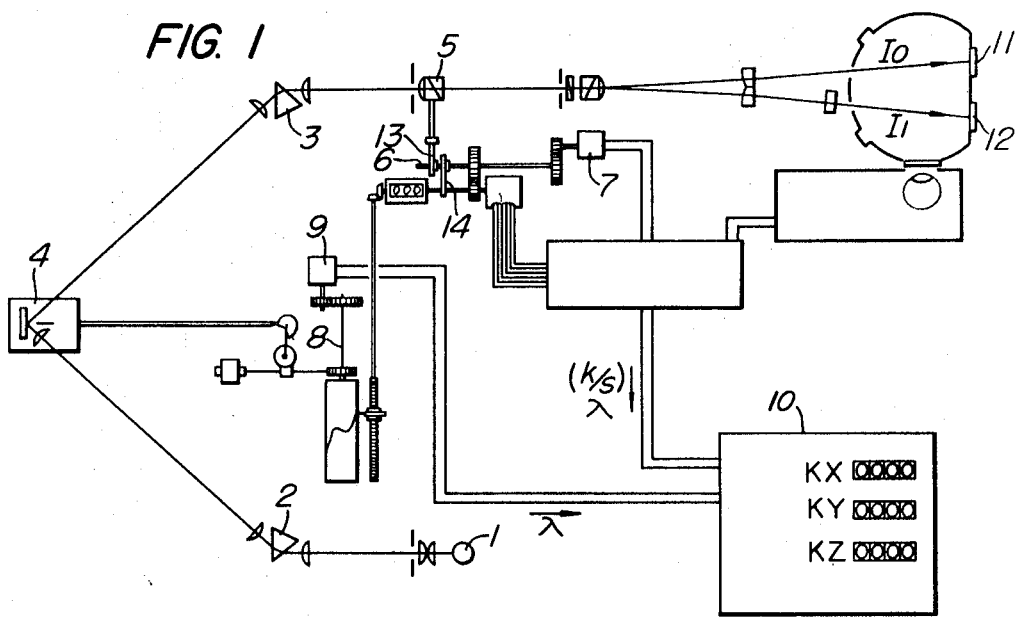
FIG. 1 is a diagrammatic representation of the present invention applied to a Hardy-type recording spectrophotometer.
Figure 2:
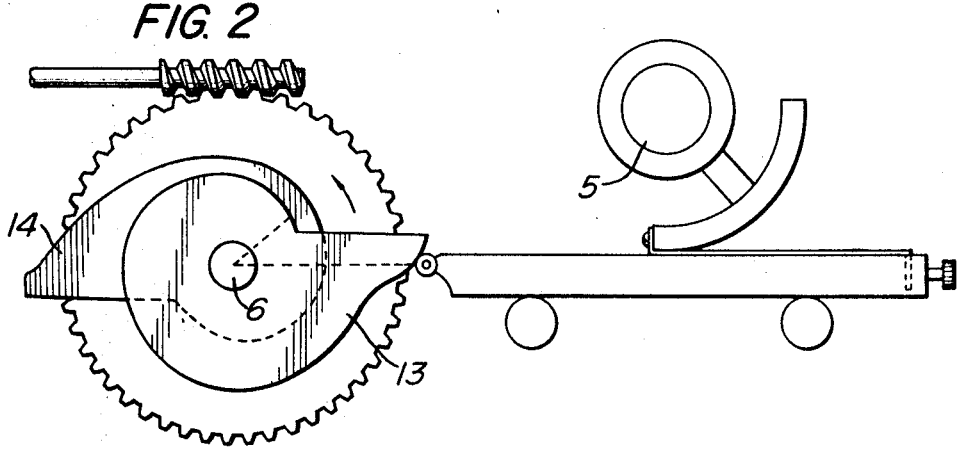
FIG. 2 is an enlarged detail of the cam arrangement of FIG. 1.

The present invention is applied to the Hardy-type recording spectrophotometer. Fig. 1 illustrates an example of the schematic view of the present invention applied thereto. The light from a light source 1 passes through prisms 2 and 3, and a reflecting mirror mechanism 4, and is automatically separated into spectra. The spectral light is separated into two polarized lights, which irradiate to a white standard 11 and a specimen 12 as $I_o$ and $I_l$ respectively. At this time, the intensities of lights reflected from 11 and 12 respectively are automatically adjusted by a first Rochon prism 5 capable of adjusting the $I_o/I_l$ ratio so that the intensities of reflected lights may be equal. Such adjustment can be made by rotating prism 5 in a range of about 45° to change the polarization axis. For this purpose, a cam mechanism as shown in FIG. 2 is used. Generally, the Hardy-type recording spectrophotometer is provided with an 100 percent cam and 20 percent cam, wherein a rotational angle of cam shaft 6 is linearly in proportion to the value of $R = I_o/I_l$, a log cam or log-log cam which is in proportion to the logarithm of $R = I_o/I_l$, that is, $-\log I_o/I_l$ or log $(-\log I_o/I_l)$, and an R cam which is in proportion to $\log(1-I_o/I_l)^{2/2} I_o/I_l$. These cams are shown as 14.

In the present invention, a cam 13 wherein the rotational angle of the cam shaft is in proportion to $K/S = (1-I_o/I_l)^2/2I_o/I_l$ is used in place of above-mentioned cams 14, and said rotational angle is transferred to an automatic tristimulus integrator 10 through a selsyn motor 7, and at the same time the rotational angle of the wavelength forwarding shaft 8 is transferred thereto through another selsyn motor 9. Integral calculation is carried out on the basis of these two data, and the result of calculation is shown as KX, KY and KZ values.

In this case, the value of $K/S = (1-I_o/I_l)^2/2I_o/I_l$ is in a range of 0 to infinity, because of the value of $R = I_o/I_l$ is in a range of 0 to 1. Accordingly it is impossible to prepare such cam 13. Thus, it is practically suitable to restrict $R=I_o/I_I$ to a range of about 0.1 to 0.9. The range below 0.1 is preferable in case of the method shown in FIG. 3 and 4.

According to the present invention, the position of the present cam 13 is shifted by 180 the counterclockwise direction, as shown in FIG. 2, with respect to another cam 14 provided so far at the Hardy-type recording spectrophotometer. However, such shift can be compensated by adjusting the phase of the selsyn motor.

In the method shown in FIG. 1, where cam 13 is used, it is pointed out that the value of $R=I_o/I_I$ is limited within a range between about 0.1 and 0.9 as above-mentioned, so it is not always suitable for practical use.

The method which overcomes this defect will be shown as follows.

According to the present invention, measurement is made using an R cam, wherein the rotational angle of the cam shaft is in proportion to log $(1-R\lambda)^2/2R\lambda$, in combination with another cam (cam 3 and 4 respectively in FIG,. 4 and FIG. 16).

Figure 3:
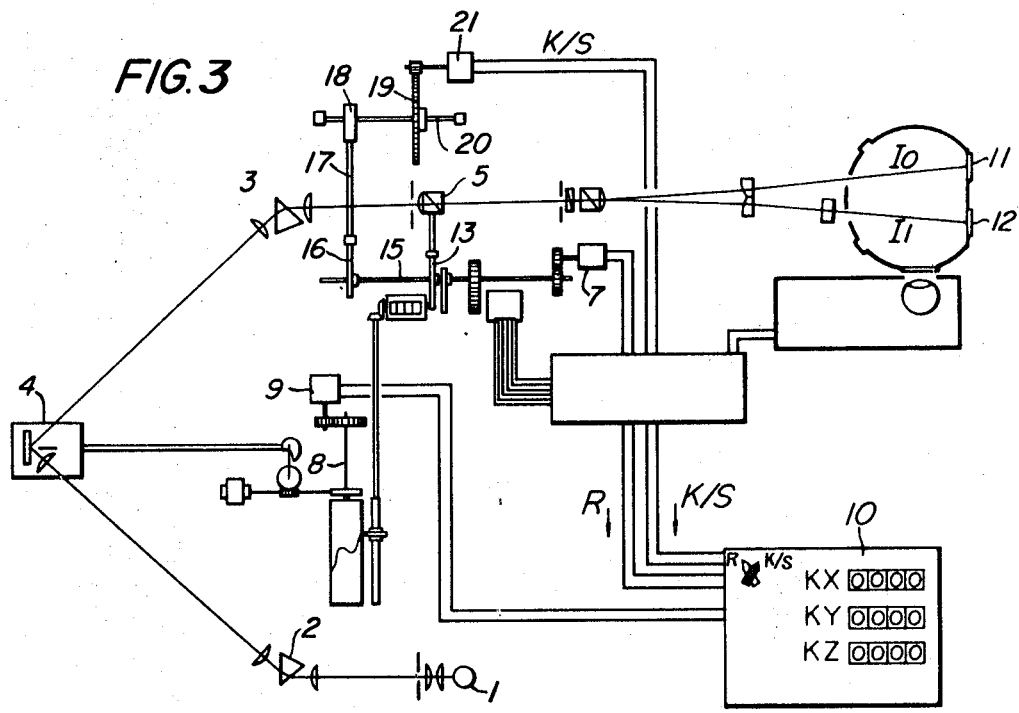
FIGS. 3 and 4 are views similar to FIGS. 1 and 2, respectively, showing an alternate embodiment of the present invention.
Figure 4:
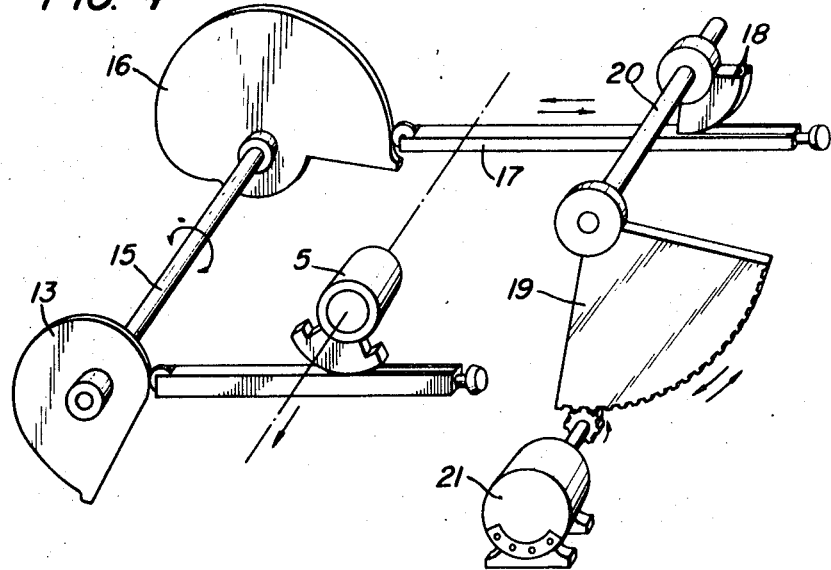

FIG. 3 shows a schematic view of the entire construction, and FIG. 4 shows the conversion transfer mechanism.

Though the structure of recording spectrophotometer itself is the same as in FIG. 1, the cam mechanism and the conversion transfer mechanism of rotation of the cam shaft to the automatic tristimulus integrator are different from those disclosed in FIG. 1.

As in FIG. 1, a Rochon's prism capable of adjusting the intensities of monochromatic lights $I_o$ and $I_I$ reflected from the standard white surface and the specimen respectively is rotated by a cam 13.

As can 13, the so-called "R cam" is used, wherein the rotational angle is in proportion to log $(K/S) = \log[(1-I_o/I_I)^2/2I_o/I_I]$.

On the shaft 15 to which said R cam is fixed, another logarithmic cam 4 is placed on the same axis. The logarithmic cam 4 is so prepared that a change in the rotational angle may be a logarithm of change in cam size. The rotational angle of the R cam shaft which is in proportion to log(K/S) is converted to a change which is in proportion to (K/S) through the rotation of the logarithmic cam 16, and further to a linear motion of the cam follower 17 which is in contact with logarithmic cam 16.

Consequently, the cam follower 17 moves linearly forwards or backwards with respect to the cam 16, in proportion to $(K/S) = (1-I_o/I_I)^2/2I_o/I_I$.

The distance in which the cam follower 17 is moved forwards or backwards by the logarithmic cam 16 is converted to a rotational motion of a fan-shaped fitting 18 by a thin metallic band connected with the fan-shaped fitting and the cam follower 17. rack and pinion means can be used instead of the fan-shaped fitting. A gear 19 having a larger diameter is fixed to a shaft 20 to which said fan-shaped fitting 18 or pinion gear is fixed. Further, a small gear is engaged with 19. A selsyn motor 21 connected to an automatic tristimulus integrater 10 is fixed to said small gear.

Thus, the rotational angle of the cam shaft 15 corresponding to log $[(1-I_o/I_I)^2/2I_o/I_I$ is automatically magnified and converted to the rotational angle of a selsyn motor corresponding to $(1-I_o/I_I)^2/2I_o/I_I$, whereby calculation is automatically carried out and the density stimulus value of the three primary colors, KX, KY and KZ are obtained.

In place of the cam 13 of $K/S=(1-I_o/I_I)^2/2I_o/I_I$ as disclosed in FIG. 1, a cam may be prepared so that its rotational angle may be in proportion to the value of an improved function of $K/S=(1-I_o/I_I)^2/(I_o/I_I-R_o)(1+K\cdot I_o/I_I)$ and may be applied to the Hardy-type recording spectrophotometer, wherein $R_o$ is a value of about 0.02 in case of ordinary textile, and K is an inner surface reflection and depends upon the mass to be measured, but may be equal to 1 in carrying out the present invention. A method using said apparatus for measuring the color density is explained in the present Example.

In the method shown in FIG. 3, in place of the R cam, a cam may be prepared so that its rotational angle may be in proportion to the value of another function of log $K/S=\log[(1-I_o/I_I)^2/(I/I_I-R_o)(1+k\cdot I_o/I_I)]$ and may be applied.

In carrying out the present Example, various cams having several different $R_o$ values are prepared, and selectively used, depending upon the objective specimen. By so doing, more precise measurement can be effected than the method shown in FIG. 1 or FIG. 3.

Figure 5:
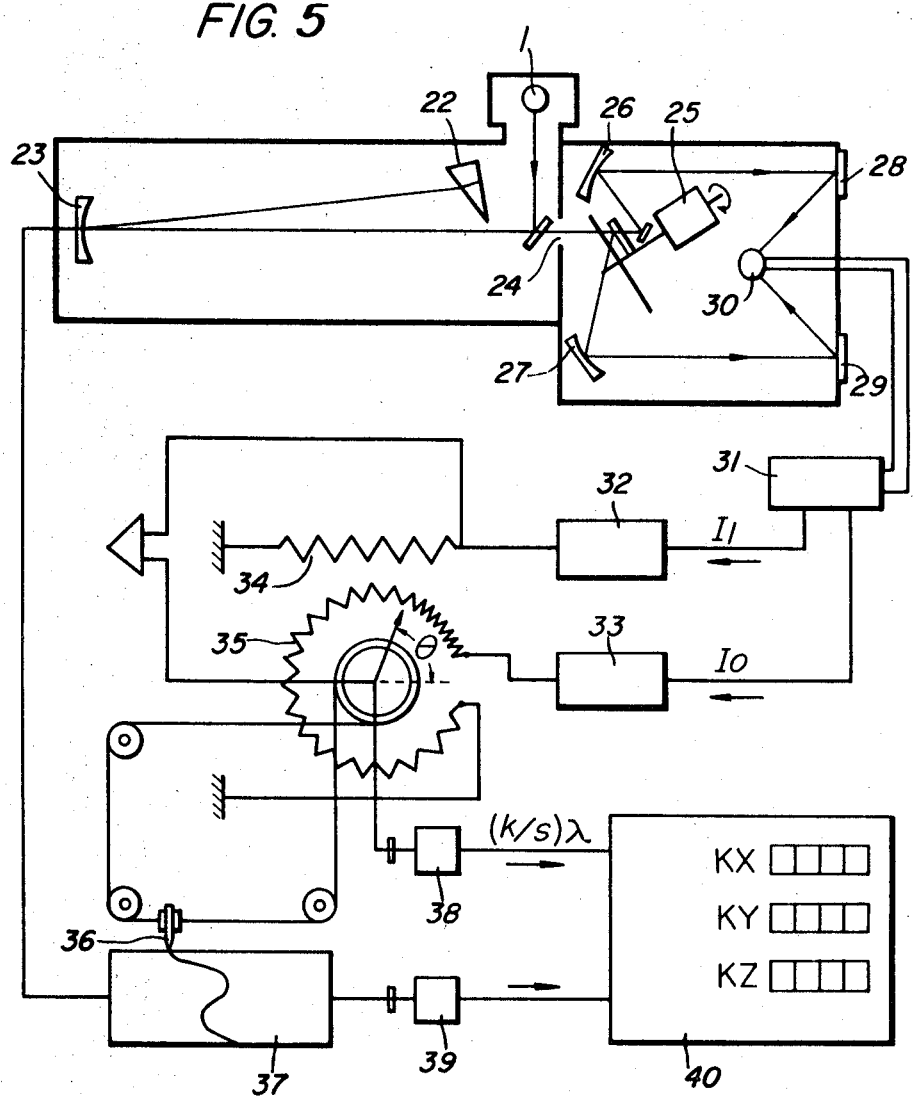
FIG. 5 is a diagrammatic representation of the present invention applied to a Beckman-type recording spectrophotometer.

The present invention may be further applied to a Beckman-type recording spectrophotometer. Generally in the Beckman-type recording spectrophotometer, the light from a light source 1 is automatically separated, as shown in FIG. 5, into spectral lights by means of a prism 22 and a slightly rotating concave mirror 23 for wave length conversion, and the spectral lights pass through a slit 24 and alternately irradiate the standard white surface 28 and specimen 29 by means of rotational sector 25 and reflecting mirrors 26 and 27. The reflected lights are converted to photocurrents by a light receiver 30, and the photocurrent from the standard white surface and the photocurrent from the specimen are separated as $I_o$ and $I_I$ respectively by a signal identification device 31. These photocurrents are amplified by amplifiers 33 and 32 respectively. The signal from the specimen is put into constant resistance 34, and the signal from the standard white surface is put into a rotation-type potentiometer 35. In 35, a collector is allowed to rotate until the voltage is equal to that of 34 by an automatic equilibrium mechanism. At that time, the rotational angle is magnified to a linear motion. which drives a recorder pen 36 to record the measured value. Generally, a linearly wound or logarithmically wound ($-\log T$) potentiometer is used as 35.

In the present invention, the potentiometer is so wound that the rotational angle may be in proportion to $(1-I_I/I_o)^2/2I_I/I_o$, as shown in FIG. 5, and the rotational angle is converted to the linear motion, whereby a graph is plotted on a recording paper attached to a recorder 37 by means of a recording pen 36.

In this case the rotational angle $\theta$ of the potentiometer may be transferred to an automatic tristimulus integrator 40 through a selsyn motor 38, and the integral calculation can be automatically carried out, using the rotational angle of the wave length-forwarding shaft transferred from another selsyn motor 39 at the same time, whereby the color density stimulus values, KX, KY and KZ can be obtained.

What I claim is:

1. In a recording spectrophotometer of the flickering beam type for measuring the reflectance $R\lambda$ of a colored sample in which a Rochon prism is rotated through an angle $\alpha$ to control the relative intensities of the beams and thereby to compensate for the reflectance of the colored sample and which includes an integrator for automatically calculating tristimulus values X, Y and Z in accordance with the wavelength or frequency of monochromatic light being reflected into the spectrophotometer by the colored sample, the improvement which comprises, a drive linkage between said prism and the integrator, said linkage comprising, a driving element whose rotational angle is directly proportional to K/S where K/S is the Kubelka-Munk function or a recognized equivalent optical density function whose value is proportional to the concentration of the colorant in said colored sample, whereby the values integrated by said integrator are the density tristimulus values KX, KY, and KZ where $$KX = \int (K/S)\bar{x}\lambda P\lambda d\lambda$$
$$KY = \int (K/S)\bar{y}\lambda P\lambda d\lambda$$
$$KZ = \int (K/S)\bar{z}\lambda P\lambda d\lambda$$

wherein $\bar{x}\lambda$, $\bar{y}\lambda$, and $\bar{z}\lambda$ are spectral tristimulus values of CIE Standard Observer, respectively, and $P\lambda$ is a spectral distribution of standard illuminant.

2. A recording spectrophotometer according to claim 1 wherein said spectrophotometer is of the Hardy-type and wherein said driving element comprises an R cam operatively connected to rotate said Rochon prism, a log-linear conversion cam mounted coaxially with the R cam for converting log (K/S) value to (K/S) value, a cam follower in contact with the log-linear conversion cam, and means responsive to and amplifying movement of the follower and converting the same into a rotational angle of a selsyn motor connected to said integrator.

3. In a photoelectric recording spectrophotometer of the flickering beam type for measuring the reflectance $R\lambda$ of a colored sample in which two incident beams are flickered with a sector and the reflectances are measured with a potentiometer so wound that the rotational angle is proportional to the reflectance, the improvement which comprises:

1. A potentiometer so wound that the rotational angle is directly proportional to K/S where K/S is the Kubelka-Munk function or a recognized equivalent optical density function whose value is proportional to the concentration of the colorant in said colored sample,
2. Means to convert said rotational angle into a rotational angle of a selsyn motor, and
3. an integrator connected to said selsyn motor, whereby the values integrated by said integrator are the density tristimulus values KX, KY, and KZ where $$KX = \int (K/S)\lambda \bar{x}\lambda P\lambda d\lambda$$
$$KY = \int (K/S)\lambda \bar{y}\lambda P\lambda d\lambda$$
$$KZ = \int (K/S)\lambda \bar{z}\lambda P\lambda d\lambda$$

wherein $\bar{x}\lambda$, $\bar{y}\lambda$, and $\bar{z}\lambda$ are spectral tristimulus values of CIE Standard Observer, respectively, and $P\lambda$ is a spectral distribution of standard illuminant.